July 21, 1970 R. P. SHIVELY ET AL 3,521,251

MAGNETIC CORE RING COUNTER WITH TRANSISTOR SWITCHES FOR DRIVING A MEMORY ARRAY

Filed March 21, 1967 2 Sheets-Sheet 1

INVENTORS
RICHARD P. SHIVELY
JOSEPH F. VALLINO
BY
Ernest L. Brown
ATTORNEY

RICHARD P. SHIVELY
JOSEPH F. VALLINO
INVENTORS

BY

Ernest L. Brown
ATTORNEY

United States Patent Office 3,521,251
Patented July 21, 1970

3,521,251

MAGNETIC CORE RING COUNTER WITH TRANSISTOR SWITCHES FOR DRIVING A MEMORY ARRAY

Richard Paul Shively and Joseph F. Vallino, Los Angeles, Calif., assignors to Litton Systems, Inc., Beverly Hills, Calif., a corporation of Maryland Filed Mar. 21, 1967, Ser. No. 624,918
Int. Cl. G11c 7/00, 11/06; H03k 23/32
U.S. Cl. 340—174 5 Claims

ABSTRACT OF THE DISCLOSURE

A circuit in which current is channeled from a current source sequentially to circuits, such as the lines of a matrix or computer memory, through transistor switches which are controlled by the stepping of a magnetic core ring counter or shift register.

SHORT DESCRIPTION OF THE INVENTION

Figure 1:
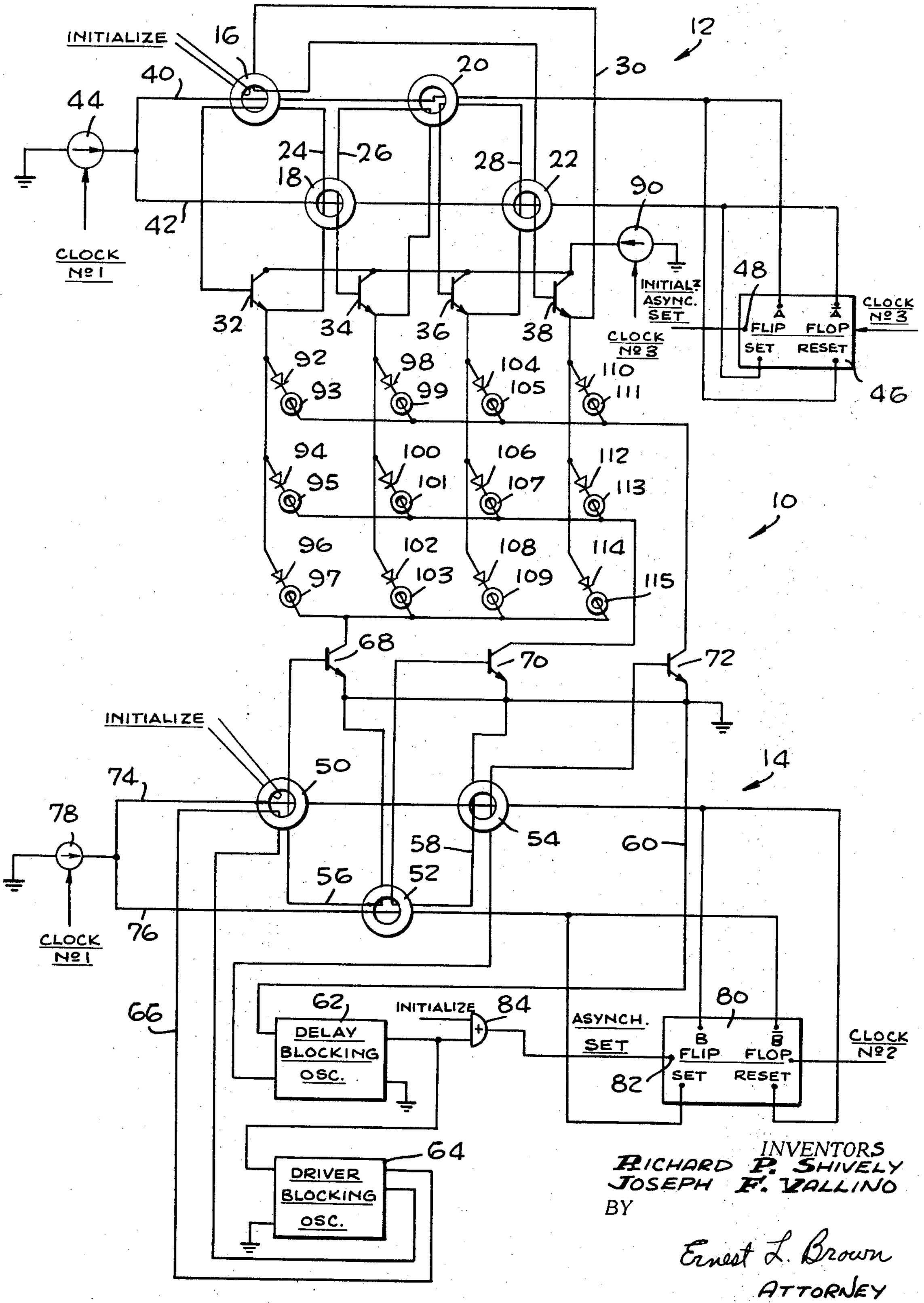

In matrix circuits, such as magnetic core memory arrays, and the like, it is customary to channel currents through the columns and lines of the matrix by using transistor switches. The transistor switches, in turn, are customarily controlled by logical circuitry. It is customary, particularly when a magnetic core memory is driven, to isolate the control circuit of the transistors from the rest of the logical circuitry by means of isolation transformers, and the like, to allow the potential of the base and emitter of the transistors to float while still controlling the potential between them.

The device of this invention uses a plurality of magnetic cores in a magnetic core ring counter or shift register in which the diodes which cause the ring counter to count in a predetermined direction also form the base-to-emitter junctions of transistor switches which have their collector-emitter paths in series with the circuits to which the current is to be channeled. The opening and closing of each collector-emitter path is similar to the opening and closing of a switch. Because the switching characteristics of magnetic cores are not highly uniform or constant over temperature, the precise timing of the opening and closing of the transistor switches which are controlled by the magnetic core ring counter are not highly accurate. However, the current source producing the current, which is switched by the transistors, may be timed accurately with the switching transistors merely used to channel or direct that timed current to one circuit or the other.

The switching scheme of this invention may be used to channel, for example, read currents or write currents to a matrix of storage cores. The magnitude and timing of the current is not controlled by the opening and closing of the switching transistors but by the precise timing of the current pulse at the source of current.

Typically a magnetic core shift register, or ring counter, uses a plurality of ferromagnetic cores each having "advance windings" which are linked to the next succeeding core in the shift register. As a core in the shift register changes remanent state, it generates a current in the advance windings which is transmitted to the next succeeding core of the register to cause that core to shift remanent states. The next core is then shifted back to its original remanent state by a timed pulse which transmits current through the advance winding of that core to change the remanent state of the next succeeding core. Blocking diodes are connected into the advance windings so that the register shifts in one direction only and to block undesirable transients.

In the device of this invention, the blocking diodes in the advance windings are the base-to-emitter junctions of switching transistors whereby, when current flows in each advance winding, a particular collector-to-emitter circuit is rendered conductive. A moment after the transistor is rendered conductive, current from a current source is clocked through the collector-to-emitter path.

It is therefore an object of this invention sequentially to render circuits conductive.

It is another object of this invention sequentially to render transistors conductive.

It is also an object of this invention to channel current from a current source, in sequence, to a plurality of electrical circuits.

It is also an object of this invention sequentially to channel current into a matrix circuit.

It is another object of this invention sequentially to channel current to the various rows and columns of an electrical matrix circuit.

It is likewise an object of this invention sequentially to channel current to the various rows and columns of a magnetic core memory.

It is a specific object of this invention to provide apparatus adapted to achieve the above enumerated objects.

Figure 2:
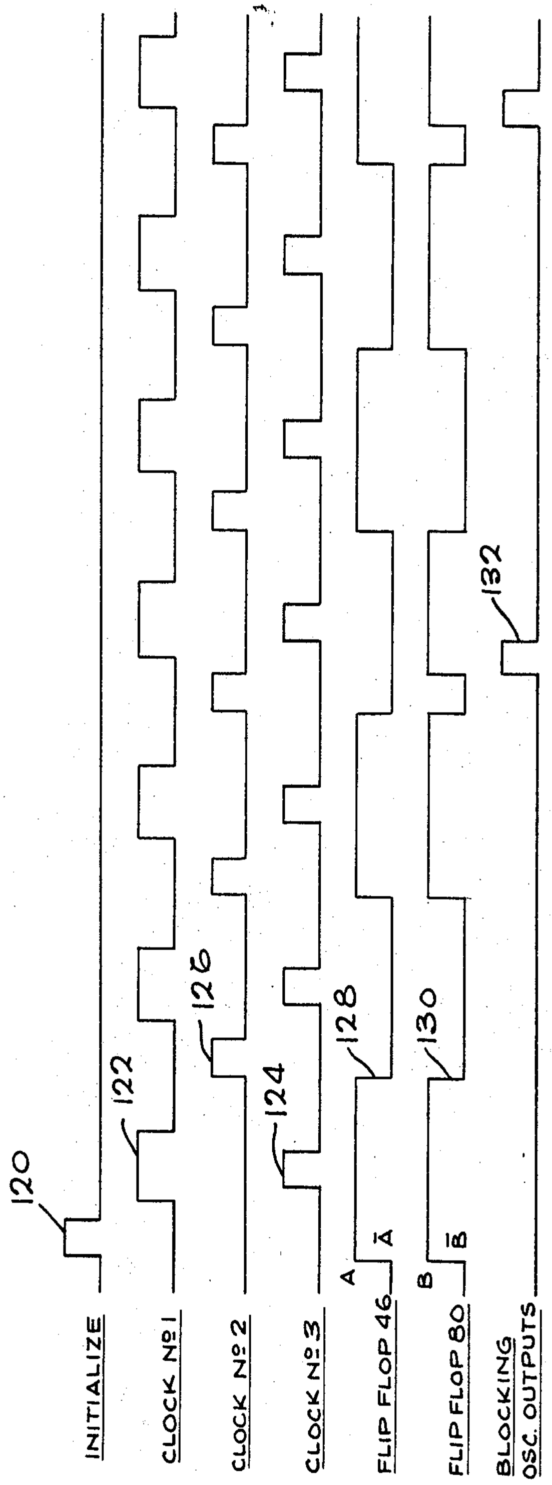

Other objects will become apparent from the following description, taken in connection with the accompanying drawings, in which:

FIG. 1 is a schematic diagram, partly in block form, of a typical embodiment of this invention; and FIG. 2 is a graph, plotted against time, of typical waveforms of current and voltage in the circuit of FIG. 1.

In FIG. 1 is shown a matrix circuit 10 including a plurality of storage cores. In general, each storage core is threaded by additional windings (not shown), the current through which may be controlled in the fashion described in connection with this invention. It is well known, for example, that each core in a storage core matrix may be threaded—for example—by two separate conductors, and that a coincidence of current is then required to change the remanent state of the storage core.

Two separate magnetic ring counters 12 and 14 are shown and adapted to channel current sequentially through the twelve cores of matrix 10. It should be noted that counter 12 is a magnetic core ring counter or shift register which uses an even number of cores while magnetic core ring counter or shift register 14 has an odd number of cores. Both an even number of cores ring counter and an odd number of cores ring counter are shown to explain the invention completely. It is to be stressed that both of the ring counters 12 and 14 could have had an even number of cores or both could have had an odd number of cores. Further, it is to be stressed that a single ring counter could have been used to channel the current sequentially through the cores of matrix 10. Two ring counters were used in order to factor the switching, i.e. in order to accomplish the switching with the minimum number of pieces of equipment.

In general, to factor the switching arrangement, a different number of cores must be included in the ring counter 12 than is included in the ring counter 14. It is usual for the difference in number of the cores in the ring counter 12 and the number of cores in the ring counter 14 to differ by one core. The number of separate cores in matrix 10 which may be switched by the factor arrangement shown in FIG. 1 is equal to the product of the number of cores in counter 12 by the number of cores in counter 14 divided by the difference between the number of cores in counter 12 and the number of cores in counter 14.

Each of the ferromagnetic cores 16, 18, 20 and 22 of shift register or ring counter 12 has an advance winding 24, 26, 28 and 30. Comprising a drive winding connected at one end to a prime winding threading a corresponding core. Each of the advance windings is connected to a diode, comprising the base-to-emitter junction of the transistors 32, 34, 36 and 38, which is adapted to allow current to flow in one direction only, thereby to advance the register 12 consecutively from core 16 to core 18 to core 20 to core 22 and back to core 16.

The cores of the register 12 are threaded by two conductors 40 and 42 with conductor 40 threading cores 16 and 20 and conductor 42 threading cores 18 and 22. A current source 44 is connected to be controlled by a clock source (not shown) whose waveform is shown in FIG. 2 under the designation "Clock No. 1." The current from current source 44 is channeled either through conductor 40 or conductor 42 depending upon the setting of the flip flop circuit 46. To that end, conductor 40 is connected to the A output of flip flop 46 and conductor 42 is connected to the A output of flip flop 46. The A output of flip flop 46 is energized when the flip flop 46 is set, while the A output of flip flop 46 is energized when the flip flop 46 is reset. To set the flip flop 46 asynchronously, an input signal may be applied to the "asynchronous set" input terminal 48. An initializing voltage source (not shown) may be connected to terminal 48 to set flip flop 46 initially into its A state. The A output of flip flop 46 is connected to the reset terminal of flip flop 46; the A output of flip flop 46 is connected to the set terminal of flip flop 46. A clock source (not shown) designated "Clock No. 3" is connected to the flip flop 46 and is adapted to effect a change of state in the output of flip flop 46 depending upon the presence of a signal at the set or reset terminals thereof. The typical waveform of Clock No. 3 is shown in FIG. 2.

Each of the ferromagnetic cores 50, 52 and 54 of the magnetic ring counter or shift register 14 has an advance winding 56, 58 or 60. Comprising a drive winding connected at one end to a prime winding threading a corresponding core. Ordinarily the advance winding 60, if there were an even number of cores, would link the core 50. However, in the shift register 14, which has an odd number of magnetic cores, the advance winding 60 is channeled through a pair of blocking oscillators 62 and 64. The output of driver blocking oscillator 64 is connected to a separate winding 66 for coupling a delayed signal into the core 50. Each of the advance windings 56, 58 and 60 is connected to a diode, comprising the base-to-emitter junction of transistors 68, 70 and 72, which is adapted to allow current to flow in one direction only, thereby to advance the register consecutively from core 50 to core 52 to core 54.

The cores of the register 14 are threaded by two conductors 74 and 76, with conductor 74 threading cores 50 and 54, and conductor 76 threading core 52. Current is driven through conductors 74 and 76 from a current source 78 (which may be the same current source as current source 44) in synchronism with the signal of Clock No. 1. The current from current source 78 is channeled through conductor 74 or 76 depending upon the setting of flip flop circuit 80. To that end, conductor 74 terminates at the B output of flip flop 80; conductor 76 terminates at the B output of flip flop 80. Flip flop 80 is connected to be set asynchronously by a signal at terminal 82, i.e. set into its B condition. The output of the B terminal is connected to the reset terminal of flip flop 80; the output of the $\overline{B}$ terminal of flip flop 80 is connected to the set terminal. Clock No. 2 is connected to cycle flip flop 80 from one output condition to the other in response to signals appearing on the set and reset terminals thereof.

An asynchronous signal may be channeled to the "asynchronous set" terminal 82 from an initializing source (not shown) through an OR gate 84. The output of delay blocking oscillator 62 is also connected, through OR gate 84, to terminal 82.

The outputs of flip flops 46 and 80 are shown in FIG. 2. In FIG. 2, the flip flop signals appearing at the A and B terminals are shown; the signals appearing at the $\overline{A}$ and $\overline{B}$ terminals are opposite in phase to the A and B signals shown in FIG. 2.

The output signals of delay blocking oscillator 62 and driver blocking oscillator 64 are shown in FIG. 2.

A current source 90 is connected to the collectors of transistors 32, 34, 36 and 38 to channel current through the collector-to-emitter path of the particular transistor which is conducting. The return path for current source 90 is shown as the ground terminal connected to the emitters of transistors 68, 70 and 72.

In the matrix 10, the emitter of transistor 32 is connected to deliver the current through the circuits of blocking diodes 92, 94 and 96 and through the corresponding storage cores 93, 95 and 97.

The emitter of transistor 34 is connected to deliver current through the circuits of blocking diodes 98, 100 and 102 and through the corresponding storage cores 99, 101 and 103.

The emitter of transistor 36 is connected to deliver current to the circuits corresponding to diodes 104, 106 and 108, and to the corresponding storage cores 105, 107 and 109.

The emitter of transistor 38 is connected to deliver current to the circuits corresponding to the blocking diodes 110, 112 and 114, and to the corresponding storage cores 111, 113, and 115.

The collector of transistor 68 is connected to receive current from the circuit corresponding to blocking diodes 96,, 102, 108, 114, and from the corresponding storage cores 97, 103, 109, 115.

The collector of transistor 70 is connected to the circuits of blocking diodes 94, 100, 106, 112, and to the corresponding storage cores 95, 101, 107, 113.

The collector of transistor 72 is connected to the circuits of blocking diodes 92, 98, 101, 110, and the corresponding storage cores 93, 99, 105, 111.

The clocking of the current source 90 is from a clock (not shown) designated Clock No. 3 whose waveform is shown in FIG. 2.

In operation, an initializing signal is applied to terminals 48 and 82 and to cores 16 and 50. The initializing signal is shown at 120 in FIG. 2. The initializing signal sets flip flop 46 into its A state, and sets flip flop 80 into its B state. The initializing signal, applied to cores 16 and 50, places the remanent state of cores 16 and 50 into the proper polarity remanent state to be changed by the next application of a signal from current sources 44 and 78. Immediately thereafter Clock No. 1 generates a signal, shown at 122 in FIG. 2, which energizes sources 44 and 78 to cause storage cores 16 and 50 to change remanent states and to cause a current to flow through the advance windings 24 and 56 through the base-to-emitter circuits of transistors 32 and 68. The flow of base-to-emitter current of transistors 32 and 68 causes transistors 32 and 68 to conduct into saturation. Clock No. 3 then emits a signal, shown at 124 of FIG. 2, to cause current source 90 to transmit a current pulse through transistor 32, diode 96, core 97, and transistor 68. The current pulse through core 97 may—for example—be used to set or read the remanent state of core 97.

The channeling of current through the advance windings 24 and 56 causes magnetic cores 18 and 52 to be set to a remanent state which can be changed by a flow of current through conductors 42 and 76. Upon the occurrence of a signal, indicated by 126 in FIG. 2, of Clock No. 2, the flip flops 46 and 80 are changed to the $\overline{A}$ and $\overline{B}$ states, respectively, as shown at 128 and 130.

The ring counter 12 continues to step with each pulse of current from current source 44 to cause the collector-to-emitter paths of transistors 32, 34, 36, 38 consecutively to conduct.

Similarly, the ring counter 14 continues to step to cause transistors 68, 70 and 72 consecutively to conduct through their collector-to-emitter paths. When current is channeled through the advance winding 60, the delay blocking oscillator 62 is energized to generate a pulse, indicated by 132 of FIG. 2. The driver blocking oscillator delivers a pulse of current through winding 66 to reset the core 50 into its initial state. The signal from the delay blocking oscillator 62, through gate 84 is delivered to the terminal 82 to reset flip flop 80 into its initial state so that the sequence of operations may be repeated and so that the next consecutive current pulse from current source 78, after current is delivered through advance winding 60, is channeled to conductor 74.

Thus, current from current source 90 is consecutively channeled through the blocking diodes and their associated storage cores in the sequence 96, 100, 104, 114, 94, 98, 108, 112, 92, 102, 106, 110, 96. . . .

In describing the shift registers, the advance windings of the register cores may conveniently be designated as "unidirectional current paths."

It is apparent that although separate clocks are designated, that a timing circuit with multiple outputs, in accordance with the known art, may be used.

It is further to be emphasized that although the shown circuit links only one storage core, that an entire line or word of storage cores may be driven by each separate circuit associated with each particular diode.

In the shown circuit, no isolation transformers are necessary because the advance windings are used to control the opening and closing of the transistor switches.

Although the invention has been described in detail above, it is not intended that the invention should be limited by that description, but only in accordance with the spirit and scope of the appended claims.

We claim:

1. In combination:

a ferromagnetic core shift register including a plurality of ferromagnetic cores, each core having at least a drive winding and a prime winding, each drive winding coupled at one end to a prime winding of another corresponding core;

a plurality of transistors, with the base of each transistor connected to one end of a drive winding, and the emitter connected to one end of the prime winding of another corresponding core, whereby the collector-to-emitter current path of respective transistors is switched to a low impedance state in response to current signals through associated advance windings;

an electrical energy source, connected to said collector-to-emitter circuits of said transistors; and a plurality of separate electrical circuits, each connected to a different said collector-to-emitter path.

2. A device as recited in claim 1 and further comprising a matrix circuit having row and column current paths in which at least a portion of the row current paths of said matrix circuit are connected to said current source through the collector-to-emitter paths of said transistors.

3. A device as recited in claim 2 in which said row and column conductors of said matrix circuit thread a plurality of ferromagnetic storage cores.

4. A device as recited in claim 2 and further comprising a second ferromagnetic core shift register, including a plurality of ferromognetic cores, different in number than the number of said cores in said first shift register, coupled through advance windings to shift in synchronism with said first shift register;

a second plurality of transistors, each coupled by its base-to-emitter path to a different said advance winding of said second register, and each adapted to conduct through its collector-to-emitter path in response to signals from said advance winding of said second register; and said second plurality of transistors having their collector-to-emitter paths coupled into the said row and column current paths from said matrix circuit.

5. A device as recited in claim 4 in which the difference in number of magnetic cores in said two shift registers is only one magnetic core, and in which the separate current paths of said matrix circuit are factored between said first and second plurality of transistors to cause current consecutively to be conducted along said matrix current paths one at a time.

References Cited

UNITED STATES PATENTS

| | | | |
|---|---|---|---|
| 2,955,264 | 10/1960 | Kihn et al. | 340—174 |
| 3,267,441 | 8/1966 | Busch | 340—174 |
| 3,059,226 | 10/1962 | Einsele | 340—174 |
| 3,063,038 | 11/1962 | Davis et al. | 340—174 |
| 3,083,354 | 3/1963 | Hanewinkel | 340—174 |
| 3,128,453 | 4/1964 | Busch | 340—174 |

STANLEY M. URYNOWICZ, Jr., Primary Examiner

K. E. KROSIN, Assistant Examiner

U.S. Cl. X.R.

307—221